June 27, 1944. B. F. ARPS 2,352,466
POWER PICKUP AND DUMPING SCRAPER ATTACHMENT FOR TRACTORS
Filed March 21, 1941 3 Sheets-Sheet 1

INVENTOR.
BRUNO F. ARPS
BY A.S.Krob
ATTORNEY

June 27, 1944.    B. F. ARPS    2,352,466
POWER PICKUP AND DUMPING SCRAPER ATTACHMENT FOR TRACTORS
Filed March 21, 1941    3 Sheets-Sheet 2

INVENTOR.
BRUNO F. ARPS
BY  A. S. Krob
ATTORNEY

June 27, 1944.    B. F. ARPS    2,352,466
POWER PICKUP AND DUMPING SCRAPER ATTACHMENT FOR TRACTORS
Filed March 21, 1941    3 Sheets-Sheet 3

INVENTOR.
BRUNO F. ARPS
BY
ATTORNEY

Patented June 27, 1944

2,352,466

UNITED STATES PATENT OFFICE 2,352,466

POWER PICKUP AND DUMPING SCRAPER ATTACHMENT FOR TRACTORS

Bruno F. Arps, New Holstein, Wis., assignor to Arps Corporation, New Holstein, Wis., a corporation of Wisconsin Application March 21, 1941, Serial No. 384,496

4 Claims. (Cl. 37—126)

The present invention relates to power pick-up scrapers adapted to be directly connected to the rear end of an industrial tractor and has for its objects, providing means for loading, transporting and dumping by the simple process of operating the power lift.

An object of my invention is to provide simple lifting and connecting means for a bucket scraper having preferably automatic dumping means controlled by the lifting means.

Another object of the present invention is to provide means whereby the down suck of the scraper may be readily changed to suit the conditions of the soil being moved.

A further object of my invention is to provide means whereby when loaded, the scraper may be lifted bodily a short distance from the ground for transporting and whereby when it is desired to dump the scraper, a further lifting action of the lifting mechanism will positively dump the scraper.

An important object of the present invention is that the scraper may be dumped and held in a position whereby the cutting edge of the scraper may be used for leveling or spreading the material dumped.

The present invention is provided with means whereby the transporting height of the scraper is optionally determined.

It is an object of my invention to provide controlling means on the rear end of the scraper bucket for regulating the horizontal position of the scraper.

Generally stated, the present invention relates to a pick-up scraper which is light, strong, easily manufactured and easily attached and detached.

To these and other useful ends, my invention consists of parts, combinations of parts, or their equivalents, and mode of operation, as hereinafter set forth and claimed and shown in the accompanying drawings in which:

Fig. 4 is a fractional rear view of the cross bar to which the dumping parts are attached.

Fig. 5 is a side view of a modification.

Figure 1:
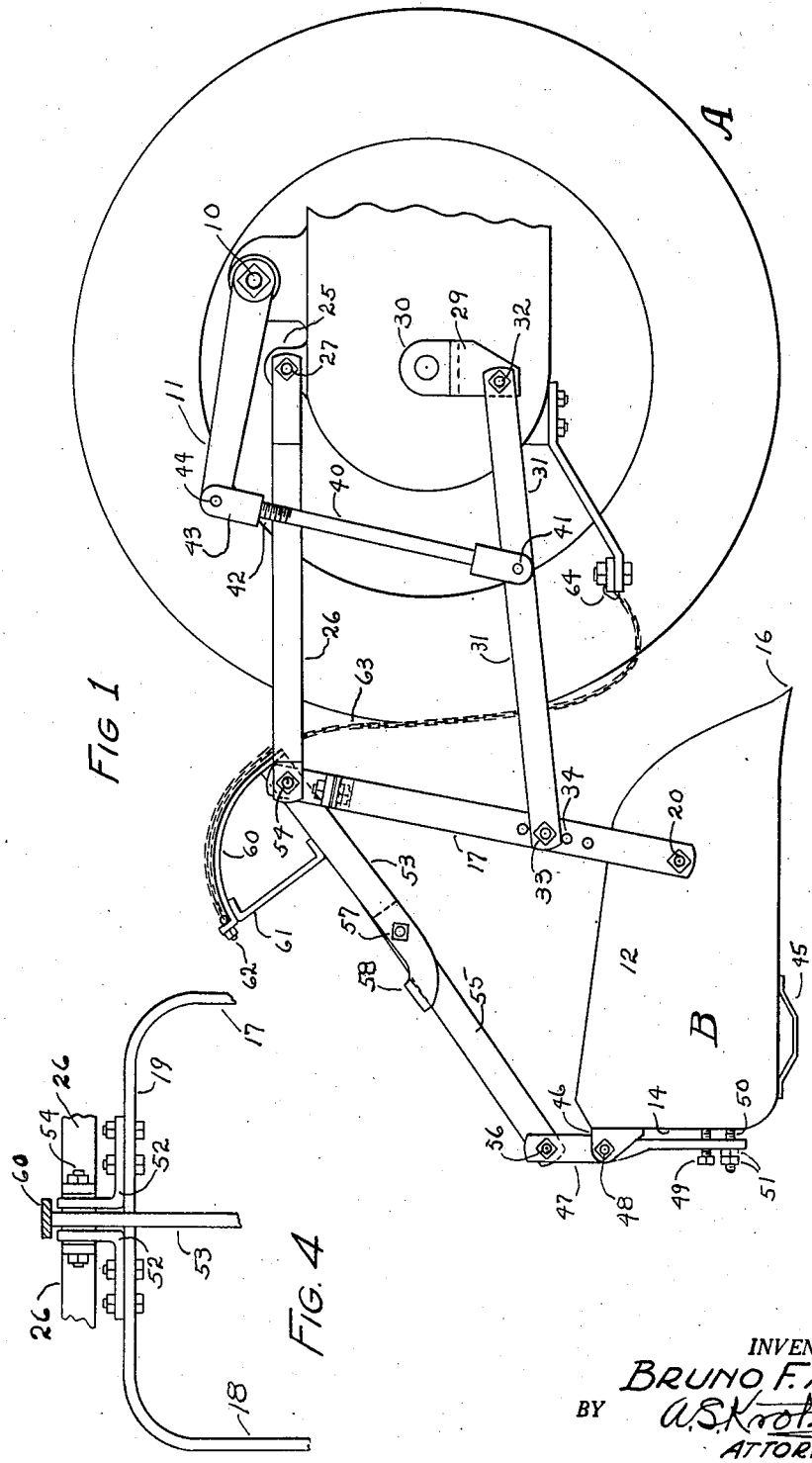
Fig. 1 is a side elevational view of my improved pick-up scraper as attached to a conventional tractor and shown in a loading position, a fraction only of the tractor being shown.

As thus illustrated, the tractor is designated by reference character A and the bucket scraper in its entirety is designated by reference character B.

Tractor A is provided preferably with a hydraulic lift which is built into the tractor and may form a part of the standard equipment thereof. This hydraulic lift is provided with a transverse shaft 10 having on opposite ends thereof rearwardly extending arms 11—11, the hydraulic lift having controlling means (not shown) whereby the rear ends of arms 11 may be raised and lowered.

Scraper B comprises side plates 12 and 13 and a rear end gate 14 and a bottom plate 15. Members 12, 13, 14, and 15 are either pressed from a single piece of sheet steel or certain parts may be welded together so as to form an integral unit. The front of the scraper is provided with the conventional cutting blade as at 16.

I provide vertically extending side bars 17 and 18, the upper ends being connected together by a transverse member 19 preferably integrally formed as shown in Figure 4.

Members 17 and 18 are pivotally secured to members 12 and 13 as at 20—20. I provide brackets 25—25 on tractor A to which the front ends of arms 26—26 are pivotally mounted as at 27—27. Arms 26 preferably extend rearwardly and inwardly (see Figure 3) and are pivoted to member 19 as will hereinafter appear.

I provide brackets 29—29 (one not shown) each being secured in a suitable position to the axle housings 30—30 of the tractor. Arms 31—31 are pivotally connected to brackets 29 as at 32—32. The rear ends of arms 31 are pivotally secured to arms 17 and 18 as at 33—33.

A number of spaced apertures 34 are provided in members 17 and 18 whereby pivots 33 may be raised or lowered. The position of members 31 is determined by the position of the power lift as follows:

Links 40—40 are pivotally connected to arms 31 as at 41—41. The upper ends of these links are screw threaded as at 42, each having a forked bracket 43 into which members 40 are screw threaded (see Figure 2).

Members 43 are pivotally secured to the rear ends of members 11 as at 44—44. Thus it will be seen that by the use of the power lift, preferably hydraulic, members 17 and 18 may be raised and lowered at will. I provide runners 45 which are secured to the rear of members 15 in order to assist in controlling the depth cut by the scraper.

I provide brackets 46—46 between which a lever 47 is pivoted as at 48. I screw thread a set screw 49 in the lower end of member 47 and adjacent the set screw I secure a bolt 50 to member 14 having a pair of nuts 51. Pivot 48 is about midway the length of lever 47 and therefore by manipulating set screw 49 and nuts 51, the upper end of member 47 may be moved fore and aft relative to member B.

I provide brackets 52—52 between which an arm 53 is pivoted by means of bolt 54. I provide another arm 55 which is pivoted to the upper end of lever 47 as at 56. Members 53 and 55 are hingedly secured together as at 57, the rear end of member 53 being bent over member 55 as at 58, member 58 being positioned so it lies on member 55 when pivots 54 and 56 are slightly above member 57. Thus the rear end of the scraper will be held from rising relative to member 54.

I provide a sector bar 60 which is preferably electric welded to the forward end of member 53 and curved upwardly and rearwardly as indicated in Figure 1, the rear end being anchored to member 53 by means of a brace 61. The upper end of member 60 is preferably turned outwardly and adapted to receive an I-bolt 62 to which a chain 63 is secured.

Chain 63 is anchored to the draw bar of the tractor as at 64, the chain being long enough to permit a desired upward movement of member B while it remains in the position shown in Figure 1 for transporting the load.

Figure 2:
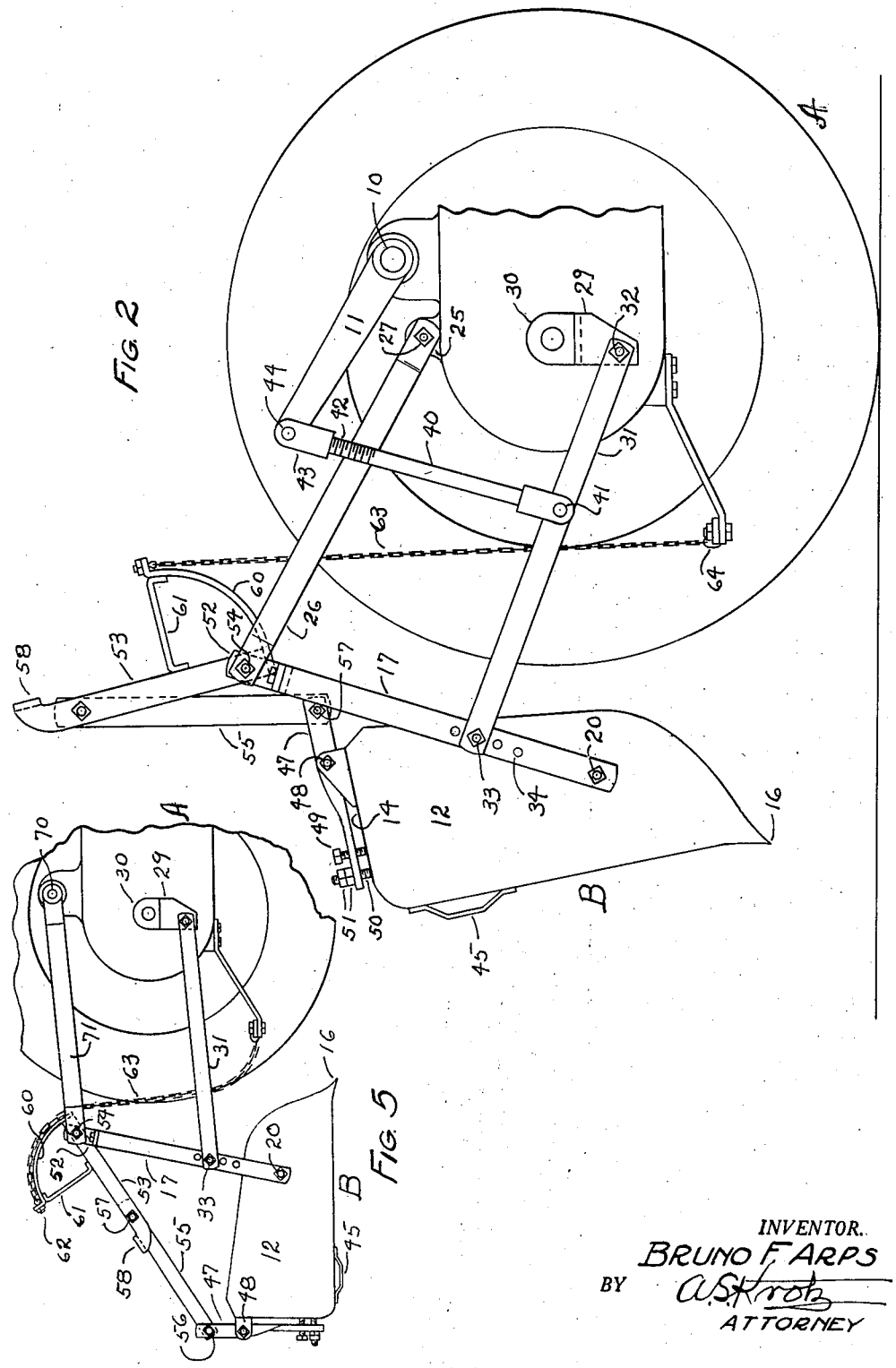
Fig. 2 is a view similar to Figure 1 except showing the scraper in a dumping position.

It will be seen by scrutinizing Figures 1 and 2 that when the power lift is operated to lift the rear end of arms 11 until the chain is made taut, a further movement of these arms will lift pivot point 57 and release the locked position of members 53 and 55 so the scraper may assume the position shown in Figure 2. Clearly the length of the chain and the design of the parts on my improved pick-up scraper will be such as will give the opportunity of dumping the scraper when in any desired vertical position and it will be seen that chain 63, as the device is raised, will definitely tilt the scraper toward its dumping position.

Generally it is desired to dump the scraper at a time when member 16 is at the desired height for leveling off the load dumped and this position of the scraper is determined by the position of the power lift and is always under the control of the operator. For this reason, the scraper may be loaded and the load transported, dumped and leveled according to the wish of the operator.

Clearly the length of chain 63 determines the maximum height of the transporting position. It will be seen that I have provided a dumping scraper which is, at all times, under the complete control of the operator and that slight adjustments of the down suck of the scraper may be made by simply adjusting members 49 and 51.

All of the parts of my device are very simple, easily manufactured at low cost, and durable and the entire device will be easily understood, operated, and adjusted by the operator.

Figure 3:
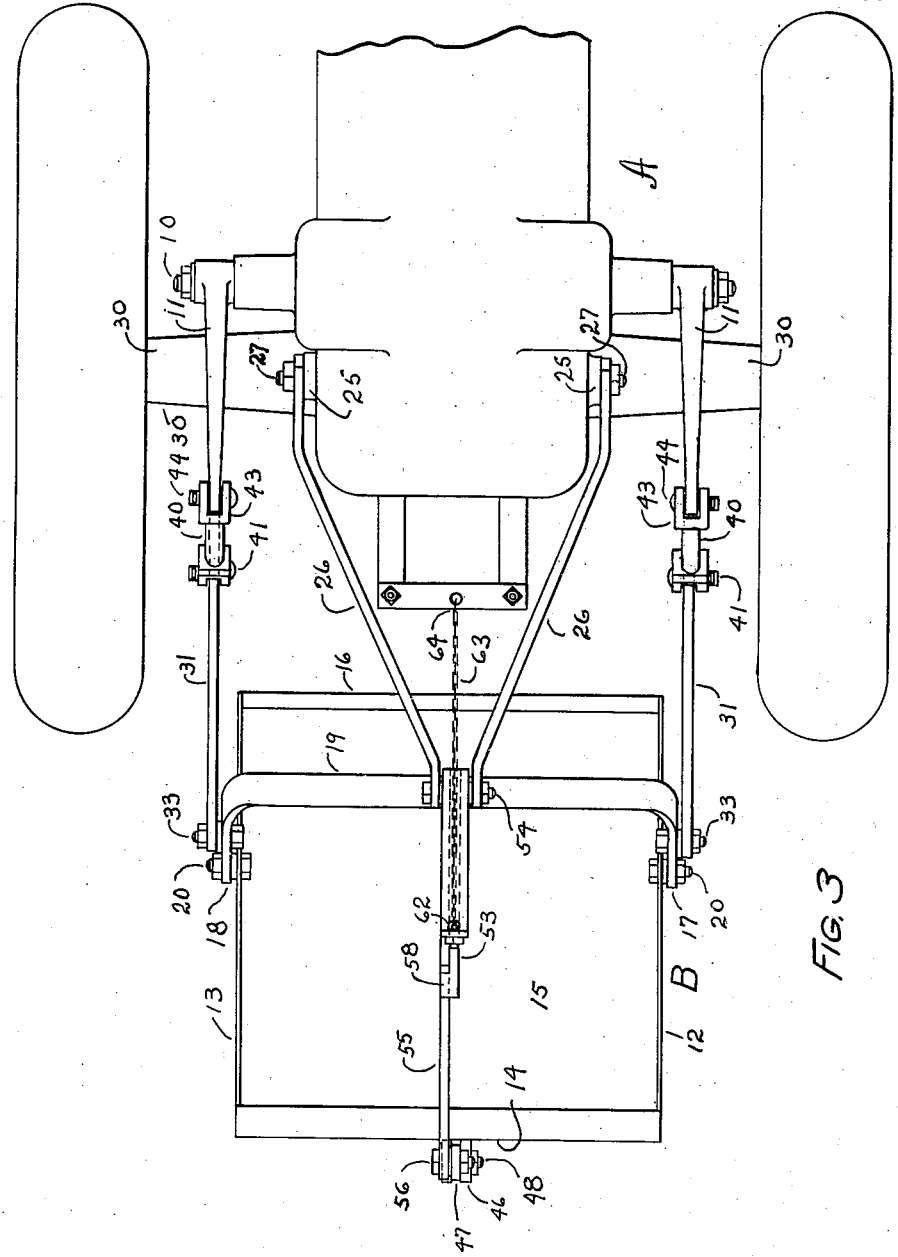
Fig. 3 is a top view of the scraper in the position shown in Figure 1.

In Figure 5, I illustrate a modification which will operate similar to the device shown in Figures 1, 2 and 3, differing only in that members 26 are dispensed with and a power lift shaft 70, which is equivalent to shaft 10 in Figure 1, is provided with rearwardly and inwardly extending arms 71—71 which are equivalent to arms 26.

It will be seen that by properly positioning shaft 70 and providing the proper length of arms 71, the device illustrated in this figure will operate exactly the same as the device shown in Figures 1, 2 and 3. The only advantage of this design is that it will cost slightly less to manufacture than the other design.

Clearly many minor detail changes may be made in the device without departing from the spirit and scope of the present invention as recited in the appended claims.

Having thus shown and described my invention, I claim:

1. A device of the class described, including a tractor having a power lift, two pairs of arms, the arms of each pair being arranged in spaced vertical relation, their front ends being pivotally secured to said tractor, bars pivotally secured to the rear ends of said pairs of arms, a bucket scraper positioned between the lower ends of said bars and being pivotally secured thereto a distance from the forward end of the scraper, said power lift having an operating connection to said pairs of arms the rear end of said scraper having a normally rigid but releasable connection to the upper ends of said bars, whereby said scraper will move in substantially a horizontal position within loading and transporting heights, means secured to said tractor and connection arranged to unlock the connection when said scraper is lifted above transporting position and whereby a further lifting of the scraper will raise the rear end of the scraper more rapidly than its front end.

2. A device as recited in claim 1 including; means whereby the rear end of said releasable connection may be adjusted fore and aft whereby the normal horizontal position of said scraper may be regulated.

3. In combination with a tractor having a power lift, upper and lower arms pivoted at their front ends respectively to vertically spaced points on the tractor and extending rearwardly therefrom in generally parallel relationship, one of the arms being connected to the power lift, a supporting element pivoted to the rear ends of said arms, a scoop pivotally connected intermediate its ends to the lower portion of said element, a linkage comprising a pair of pivotally connected sections, said linkage being pivoted at one end to the rear of the scoop and at the other end to the upper portion of the element and normally arranged to prevent tilting of the scoop about its pivotal connection with the element while the scoop is in digging or carrying position, means connected between the tractor and one section of the linkage and arranged to break the joint of the linkage upon raising of the scoop above carrying position whereby the scoop will be caused to tilt forwardly about said pivotal connection into dumping position.

4. In combination with a tractor having a power lift, upper and lower arms pivoted at their front ends respectively to vertically spaced points on the tractor and extending rearwardly therefrom in generally parallel relationship, one of the arms being connected to the power lift, an inverted generally U-shaped supporting element pivoted to the rear ends of said arms, a scoop pivotally connected intermediate its ends to the lower ends of said element, a linkage comprising a pair of pivotally connected sections, said linkage being pivoted at one end to the rear of the scoop and at the other end to the upper portion of the element and normally arranged to prevent tilting of the scoop about its pivotal connection with the element while the scoop is in digging or carrying position, means associated with the forward section of said linkage whereby the joint of the linkage may be broken and the scoop forced to tilt forward about said pivot.

BRUNO F. ARPS.